US012496471B2

(12) United States Patent
Spasiano

(10) Patent No.: US 12,496,471 B2
(45) Date of Patent: Dec. 16, 2025

(54) EMERGENCY EVACUATION SYSTEM, AN EMERGENCY EVACUATION UNIT AND OPERATION METHOD OF SUCH SYSTEM

(71) Applicant: Firebag S.r.l., Rome (IT)

(72) Inventor: Matteo Spasiano, Rome (IT)

(73) Assignee: Firebag S.r.l., Rome (IT)

( * ) Notice: Subject to any disclaimer, the term of this patent is extended or adjusted under 35 U.S.C. 154(b) by 835 days.

(21) Appl. No.: 17/782,652

(22) PCT Filed: Dec. 4, 2020

(86) PCT No.: PCT/IT2020/050300
§ 371 (c)(1),
(2) Date: Jun. 5, 2022

(87) PCT Pub. No.: WO2021/111487
PCT Pub. Date: Jun. 10, 2021

(65) Prior Publication Data
US 2022/0387828 A1 Dec. 8, 2022

(30) Foreign Application Priority Data
Dec. 6, 2019 (IT) ........................ 102019000023268

(51) Int. Cl.
*A62B 1/20* (2006.01)
*G01G 19/44* (2006.01)
(Continued)

(52) U.S. Cl.
CPC ............... *A62B 1/20* (2013.01); *G01G 19/44* (2013.01); *G01G 19/52* (2013.01); *G08B 5/36* (2013.01)

(58) Field of Classification Search
CPC ......... A62B 1/20; B64D 25/14; E04F 11/062; G01G 19/44; G01G 19/52; G08B 5/36
See application file for complete search history.

(56) References Cited

U.S. PATENT DOCUMENTS 876,893 A * 1/1908 Arnold ...................... A62B 1/20 182/48
952,239 A * 3/1910 Davidson ................. A62B 1/20 182/48
(Continued)

FOREIGN PATENT DOCUMENTS

GB 2229758 A * 10/1990 ............... A62B 1/20
JP 52007199 A * 1/1977
(Continued)

OTHER PUBLICATIONS

International Search Report and the Written Opinion Dated Apr. 6, 2021 From the International Searching Authority Re. Application No. PCT/IT2020/050300. (17 Pages).
(Continued)

*Primary Examiner* — Theodore V Adamos

(57) ABSTRACT

An emergency evacuation system from a building lying on a ground and having one or more windows, comprising at least two evacuation units, each comprising in turn support platform fixable to a frame of a respective window, a slide, having at least one module inflatable on command, wherein each slide has a first end coupled to the support platform on which it is installed, and a second free end, and wherein each slide is capable of passing from a closed position to a unfolded position. A first of the evacuation units is arranged at a lower height than a second evacuation unit such that, when the slide of the second evacuation unit is in the position unfolded, the second end free of the slide of the second evacuation unit is coupled to the support platform of the first evacuation unit.

25 Claims, 7 Drawing Sheets

(51) Int. Cl.
*G01G 19/52* (2006.01)
*G08B 5/36* (2006.01)

(56) References Cited

U.S. PATENT DOCUMENTS 1,200,686 A * 10/1916 Youngblood ............ A62B 1/20 182/51
1,599,391 A * 9/1926 Anderson ................ A62B 1/20 193/34
2,709,030 A * 5/1955 Vroman .................... E06C 9/14 182/78
4,079,812 A * 3/1978 Naka ......................... E06C 9/14 182/100
4,240,521 A * 12/1980 Naka ....................... E06C 1/381 182/189
5,025,891 A * 6/1991 Naka ......................... E06C 9/10 182/86
2013/0213737 A1 * 8/2013 Bambrick ................ A62B 1/20 182/48
2014/0291070 A1 * 10/2014 White ...................... A62B 1/20 182/48

FOREIGN PATENT DOCUMENTS

KR 10-1615728 4/2016
RU 2707894 C1 * 12/2019
WO WO 2013/034045 3/2013

OTHER PUBLICATIONS

Rapporto di Ricerca e Opinione Scritta [Search Report and Written Opinion] Dated Apr. 6, 2021 From the Ministero dello Sviluppo Economico, Direzione Generale Sviluppo Produttivo e Competitivita, Uffico Italiano Brevetti e Marchi Re. Application No. IT201923268. (9 Pages).

* cited by examiner

EMERGENCY EVACUATION SYSTEM, AN EMERGENCY EVACUATION UNIT AND OPERATION METHOD OF SUCH SYSTEM

RELATED APPLICATIONS

This application is a National Phase of PCT Patent Application No. PCT/IT2020/050300 having International filing date of Dec. 4, 2020, which claims the benefit of priority of Italian Patent Application No. 102019000023268 filed on Dec. 6, 2019. The contents of the above applications are all incorporated by reference as if fully set forth herein in their entirety.

FIELD AND BACKGROUND OF THE INVENTION

The present invention relates to an emergency evacuation system, in particular, an emergency evacuation system from buildings.

The present invention also relates to an emergency evacuation unit and a relative operating method of such a system.

More in detail, the invention relates to a system and a unit of the above type, designed and manufactured in particular to allow, in case of situations such as to endanger the safety of persons, a safe evacuation from structures such as buildings and the like.

In the following, the description will be addressed to the emergency evacuation from buildings but it is clear that the same should not be considered limited to this specific use.

Currently, in case of a medium or serious emergency, such as a fire, an earthquake, a terrorist and/or armed attack, a flood, and the like, it can happen that people get stuck inside a building due to psycho-physical impediments, unavailability of escape routes and traditional emergency exits or poor visibility due, for example, to the presence of fumes.

In particular, the aforementioned emergency situations prevent, among other things, the emergency evacuation of persons with disabilities or temporarily incapacitated. Traditional emergency exits, in fact, typically provide emergency stairs positioned inside or outside the building.

Furthermore, these emergency routes and exits can be a source of discomfort for anyone's mobility and require very long travel times with physical effort for the users, who can be subject to panic attacks, therefore increasing the risks for their health.

In fact, for example, in case of an emergency caused by a fire, the emergency stairs can be blocked by objects or flames, preventing the outflow of people to safe places.

A drawback of these known solutions consists in the fact that they cannot be used by anyone, such as, for example, the wounded, the elderly or people with motor and/or sensory disabilities.

Furthermore, a drawback of the systems according to the prior art based on straight slides, such as those described in patent applications n.102017000086175 and n.102017000086155, both in the name of Progetech, is given by the fact that they have as a limit the fact that they are not able to get above the second floor of a building.

A further drawback of these known solutions consists in the fact that they cannot be used in case of buildings subject to historical constraints, or buildings which, due to constraints which they are subject to, are not equipped with escape systems perfectly suited to the outflow capacity.

In light of the above, it is, therefore, necessary to intervene by external rescue entities, such as the Fire-Fighters and the like.

Generally, the intervention of the Fire-Fighters provides for the safety of the subjects present inside the structure through, for example, the use of telescopic ladders to reach the windows of the building.

However, one of the main drawbacks of these known solutions consists in the fact that they require long evacuation times.

Another drawback of these known solutions consists in that they are unable to reach high floors due to physical limits (length, rigidity, etc.) of the tools used.

In fact, the telescopic ladders used by external rescue agencies are not able to exceed a certain height above the ground, allowing the intervention teams to typically reach only the first floors of the building.

A further drawback of these known solutions consists in the fact that they require long intervention times, thus not allowing a quick safety of the subjects present in the building.

Again, a drawback of these known solutions consists in the fact that they are often bulky, unstable, require the presence of several operators and require high maintenance costs.

Among other things, stair systems can be very inclined and therefore not so easy.

SUMMARY OF THE INVENTION

In light of the above, it is therefore an object of the present invention to overcome the limitations of the prior art set out above by providing an emergency evacuation system, which is equipped with a plurality of foldable and tiltable evacuation units.

A further object of the invention is to provide an emergency evacuation system that allows users to descend easily and without danger to the ground.

Another object of the present invention is to provide an emergency evacuation system, which is highly reliable, relatively simple to manufacture, and at competitive costs if compared to the prior art.

Another object of the invention is to provide an emergency evacuation unit, which allows a safe landing of users during the evacuation operations.

It is therefore object of the present invention a emergency evacuation system from a building lying on a ground and having one or more windows, comprising: at least two evacuation units, each comprising in turn support platform fixable to the frame of a respective window, a slide, having at least one module inflatable on command, wherein each slide has a first end coupled to the support platform on which it is installed, and a second free end, and wherein each slide is capable of passing from a closed position to a unfolded position; wherein a first of said evacuation units is arranged at a lower height than a second evacuation unit such that, when said slide of said second evacuation unit is in said position unfolded, said second end free of said slide of said second evacuation unit is coupled to said support platform of said first evacuation unit, wherein each evacuation unit comprises at least one hinge, and wherein said support platform is configured to rotate around said at least one hinge by a concave angle.

Always according to the invention, said concave angle may be equal to 270°.

Still according to the invention, each evacuation unit may comprise a first hinge and at least one second hinge, and wherein each evacuation unit is capable of passing from said rest position to said operative position by means of a first rotation of said support platform around said first hinge and a second rotation of said platform around said at least one second hinge, wherein said second rotation is subsequent to said first rotation.

Advantageously according to the invention, when said slide of said first evacuation unit is in said unfolded position, said second free end of said slide of said first evacuation unit may be configured to couple to said support platform of a further evacuation unit placed at a lower height with respect to said first evacuation unit or it couples to with said ground.

Further according to the invention, each evacuation unit may be capable of passing from a rest position, wherein said support platform is arranged inside said building, at an operating position, wherein said support platform is arranged outside of said building and is substantially perpendicular to an external wall of said building, being in correspondence of the respective window.

Always according to the invention, said emergency evacuation system may comprise activating members, arranged in correspondence with said respective windows, for opening said respective windows, may comprise a plurality of detecting and moving units, arranged in correspondence with said windows, for moving said respective evacuation units, and may comprise a logic control unit, connected to said activating members and said detection and moving units, wherein said logic control unit is configured for sending a first control signal to said activating members to open said respective windows, and sending a second control signal to said detecting and moving units to move each evacuation unit from said rest position to said operating position.

Still according to the invention, each detecting and moving unit may be further configured to detect the position of said respective evacuation units and to transmit this position to said logic control unit.

Conveniently according to the invention, said emergency evacuation system may comprise a plurality of light indicators arranged in correspondence of each window, and a plurality of weight sensors arranged on each evacuation unit, wherein each light signal is capable of emitting a plurality of light signals in respective different colors to authorize a user to use said evacuation unit of said respective window, and wherein each weight sensor is capable of detecting the presence of said user on the respective evacuation unit.

It is further object of the present invention an evacuation unit from a building lying on a ground and having one or more windows, comprising a support platform, which can be fixed to the frame of a respective window, a slide having at least one module inflatable on command, wherein each slide has a first end coupled to said support platform on which it is installed, and a second free end, and is capable of moving from a closed position to an unfolded position, wherein said evacuation unit is capable of passing from a rest position, wherein said support platform is arranged inside said building, to an operating position, wherein said platform support is arranged outside of said building and is substantially perpendicular to an external wall of said building, wherein each evacuation unit comprises at least one hinge, and wherein said support platform is configured to rotate around said at least one hinge by a concave angle.

Always according to the invention, said concave angle may be equal to 270°.

Still according to the invention, said evacuation unit may comprise a first hinge and at least one second hinge, wherein said evacuation unit is capable of passing from said rest position to said operative position by means of a first rotation of said support platform around said first hinge and a second rotation of said platform around said at least one second hinge, in which said second rotation is subsequent to said first rotation.

Further according to the invention, said support platform may comprise a first portion, and a second portion movable with respect to said first portion, wherein said support platform is capable of passing from a first position, wherein said second portion is superimposed on said first portion, to a second position, wherein said first portion and said second portion are coplanar.

Still according to the invention, said support platform may further comprise at least two hinges arranged between said first portion and said second portion, and said second portion is rotatably coupled to said first portion by means of said at least two hinges.

Advantageously according to the invention, said second portion may comprise a first slot at a first end of said second portion, a second slot at a second end of said second portion, a first plurality of anchoring elements and a second plurality of anchoring elements to allow the coupling between said second free end of said slide and said support platform, wherein each anchoring element of said first plurality of anchoring elements is arranged inside said first slot, and each anchoring element of said second plurality of anchoring elements is arranged inside said second slot.

Always according to the invention, said second free end of said slide may comprise a first coupling element and a second coupling element, to couple respectively to a first anchoring element, of said first plurality of anchoring elements, and to a second anchoring element of said second plurality of anchoring elements.

Conveniently according to the invention, said coupling elements may be magnetic hooks, and said anchoring elements may be bars made of magnetic material, so that said coupling elements are capable of hooking coupling and magnetically coupling to one of said respective bars made of magnetic material.

Further according to the invention, said evacuation unit may comprise at least one hinge, and said evacuation unit may be capable of passing from said first position to said operating position by a rotation of said support platform about said at least one hinge.

Still according to the invention, said supporting elements may be configured to rotate about said at least one hinge by an angle of 270°.

Always according to the invention, said evacuation unit may comprise at least two supporting elements, each of said at least two supporting elements having a first end attached to said first portion and a second end free, wherein said at least two support elements are capable of passing from a first position, wherein they are integral with said first portion of said support platform, to a second position, wherein said second end contacts said outer wall of said building.

Advantageously according to the invention, said supporting elements may be telescopic bars.

Further according to the invention, said first portion of said support platform may comprise at least one pair of guides, and a seat slidingly movable along said at least one pair of guides, wherein said seat is capable of passing from a rearward position, wherein it is arranged in proximity of said second portion, to an advanced position, wherein it is arranged in proximity of said first end of said slide.

Conveniently according to the invention, said second portion of said support platform may comprise a support base made of magnetic material capable of coupling with said second end of said slide, said second end being realized by means of metal fabric.

Still according to the invention, said evacuation unit may further comprise a safety element arranged, in use, perpendicular to said second portion of said support platform, to prevent said second end of said slide from moving away from said second portion, and a further safety element arranged, in use, transversely with respect to said second portion, to direct and stabilize said second end of said slide in correspondence with said second portion.

It is finally object of the present invention an operating method of an emergency evacuation system from a building arranged on a ground and having one or more windows, at least two evacuation units, activating members, arranged in correspondence with said respective windows, for opening said respective windows, a plurality of detecting and moving units, arranged in correspondence with said windows, for moving said respective evacuation units, each of said evacuation units comprising in turn a support platform, which can be fixed to the frame of a respective window, each of said two or more evacuation units being capable of passing from a rest position to an operating position, and in that it comprises a logic control unit, connected to said activating members and said detecting and moving units, wherein, said method comprises the following steps: A. receiving, from said logic control unit, an alarm signal to signal any emergency situations; B. transmitting, by means of said logic control unit, a first control signal to respective activating members so as to activate the opening of said respective windows; and C. transmitting, by means of said logic control unit, a second control signal to respective detecting and moving units, so as to activate the rotation of said respective evacuation units.

Always according to the invention, said step B may comprise the sub-step of activating, by means of said logic control unit, an evacuation unit of said two or more evacuation units, arranged at a height higher than a further evacuation unit of said two or more evacuation units, only if said further evacuation unit is in said operating position.

Further according to the invention, said step C may comprise the sub-step of moving each of said evacuation units from said rest position, wherein said support platform is arranged inside of said building, to said operating position, wherein said support platform is arranged outside of said building and is substantially perpendicular to an external wall of said building.

Still according to the invention, each of said evacuation units may further comprise a slide having at least one module and inflatable on command, wherein each slide has a first end coupled to said support platform, on which it is installed, and a second free end, each slide being capable of passing from a closed position to an unfolded position, and in that it comprises, after said step C, the step of coupling said second free end of said slide of said evacuation unit, arranged at a height higher than said further evacuation unit, to said support platform of said further evacuation unit, when said slide of said evacuation unit is in said unfolded position.

BRIEF DESCRIPTION OF THE SEVERAL VIEWS OF THE DRAWINGS

The present invention will be now described, for illustrative but not limitative purposes, according to its preferred embodiments, with particular reference to the figures of the enclosed drawings, wherein.

In the various figures, similar parts will be indicated by the same reference numbers.

DESCRIPTION OF SPECIFIC EMBODIMENTS OF THE INVENTION

Figure 1:
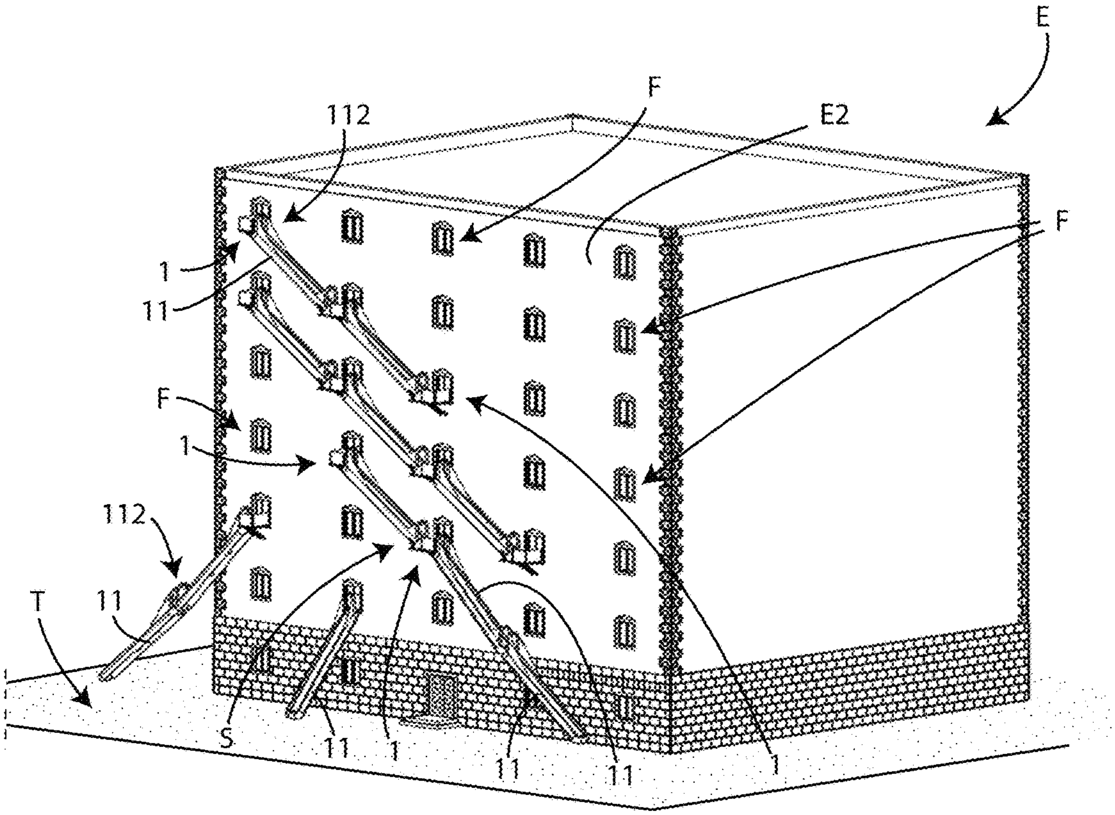
FIG. 1 shows, in perspective view, an emergency evacuation system applied to a building, according to the present invention.
Figure 2:
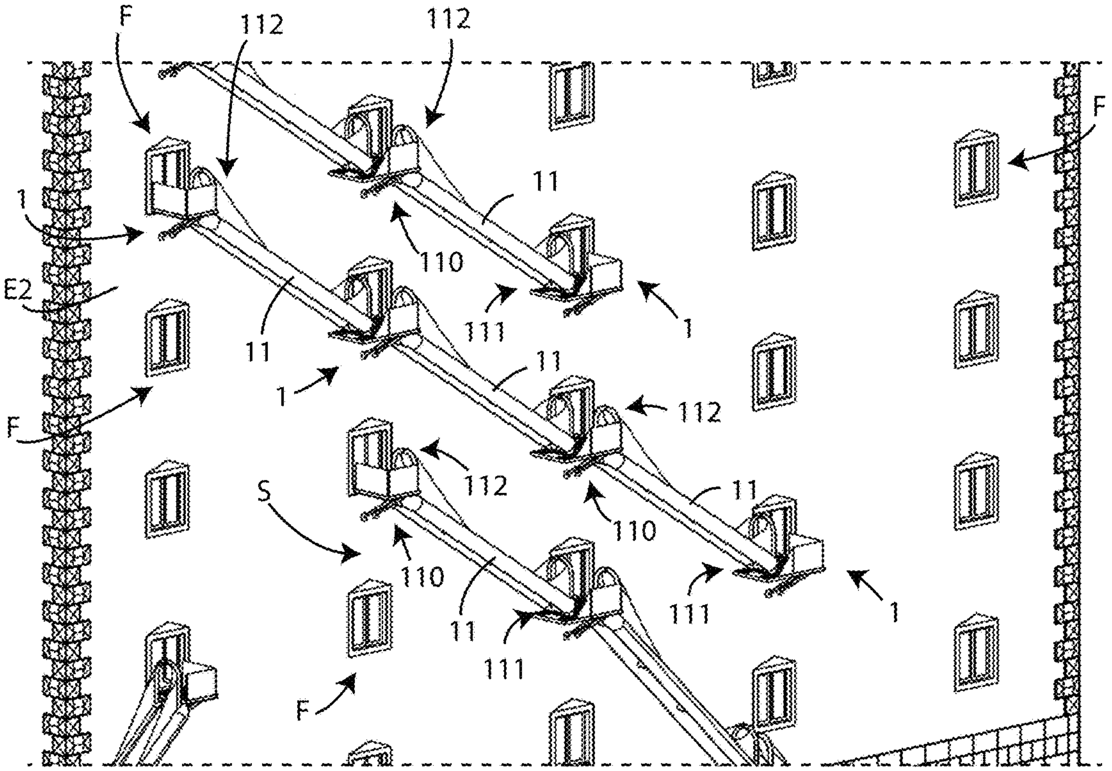
FIG. 2 is a perspective view of a detail of the emergency evacuation system of FIG. 1.

With reference to FIGS. 1-2, the emergency evacuation system S from a building E positioned on a ground T and having a plurality of windows F comprises at least two evacuation units 1 installed in correspondence with respective windows F, from which people can evacuate, at least two detection and movement units 2, each arranged in proximity to a respective evacuation unit 1, and a logic control unit U, in communication with each of said detection and movement unit 2.

In the embodiment described, said emergency evacuation system S comprises at least two evacuation units 1, and two respective detection and handling units 2. However, in further embodiments of the present invention, the number of said evacuation units 1, and therefore the number of said detection and handling units 2, can be greater than two, based on the maximum height of the window F of the building E to be evacuated. By way of example, said emergency evacuation system S can comprise an emergency evacuation unit 1 for each window F of said building E to be evacuated.

Hereinafter reference will be made to a first evacuation unit 1 and a second evacuation unit 1, where said first evacuation unit 1 is arranged at a lower height than said second evacuation unit 1.

As can be seen in particular from FIGS. 3-6, each evacuation unit 1 comprises a flat support platform 10, which can be fixed to the frame of a respective window F, two anchoring and rotation means 13, an emergency slide 11, two supporting elements 12, a protection barrier 106, and a safety element 109.

Each evacuation unit 1 is capable of passing from a rest position, in which said support platform 10 is arranged inside said building E and is arranged parallel to an internal wall E1 of said building, to an operative position, wherein said support platform 10 is arranged outside said building E and is perpendicular to an external wall E2 of said building E. Therefore, said emergency evacuation system S from building E is a retractable system S.

By way of example, said support platform 10 can be, in use, coplanar with the balustrade of the respective window F, or partially superimposed on the same balustrade.

In particular, when said evacuation unit 1 is in said rest position, said support platform 10 is contained inside a container C. Said container C is able to release from said evacuation unit 1 when it passes by said rest position to said operative position. However, in other embodiments of the present invention, said container C can be made in a different way or absent.

Said support platform 10 comprises, in turn, a first portion 100 and a second portion 101, movable with respect to said first portion 100.

Figure 4:
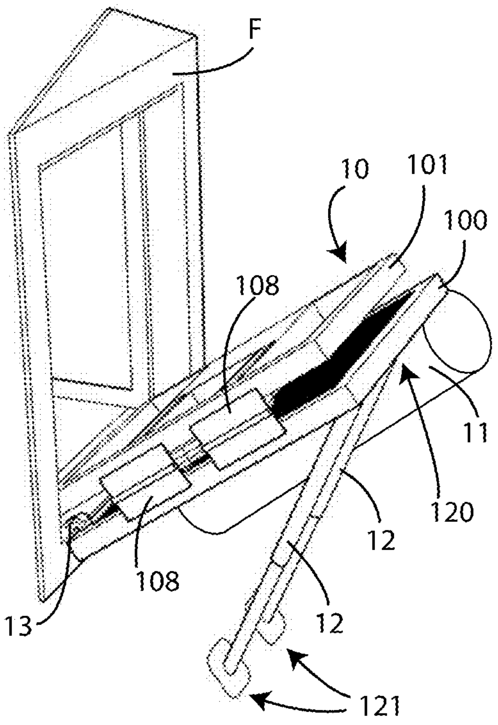
FIG. 4 shows, in perspective view, the evacuation unit of FIG. 3A, in a semi-open position.
Figure 5:
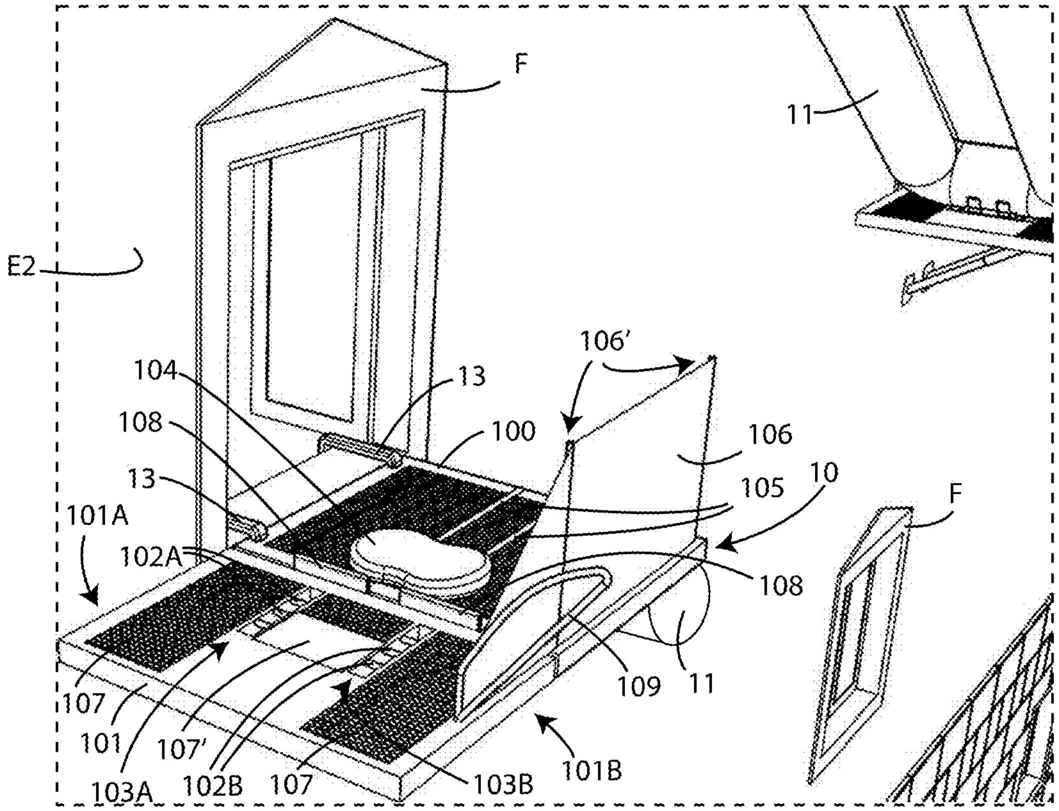
FIG. 5 is a perspective view of the evacuation unit of FIG. 3A, in an operative position.
Figure 6:
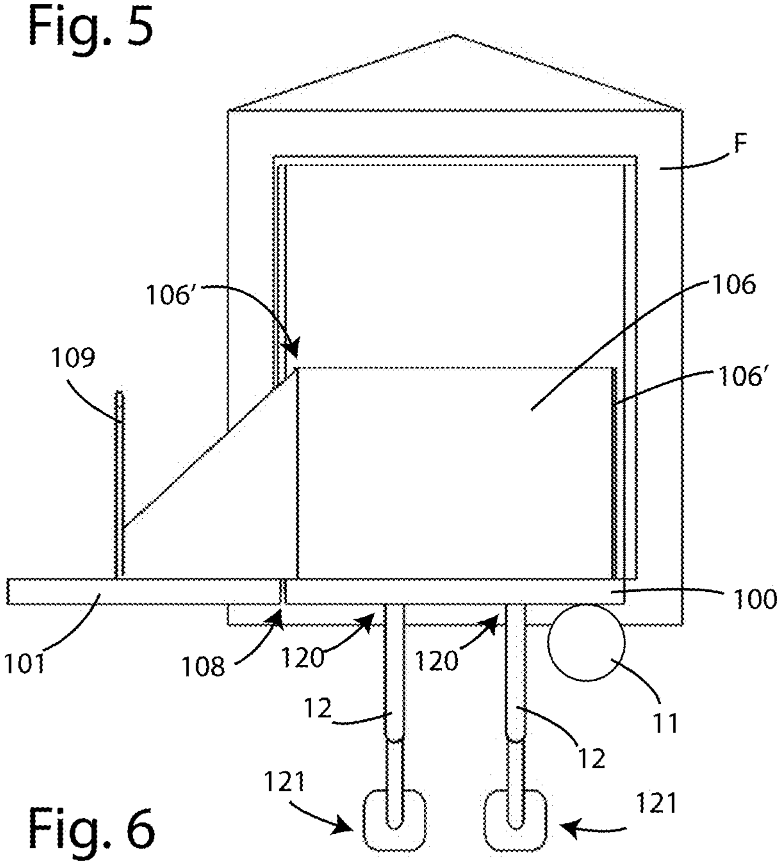
FIG. 6 shows, in front view, the evacuation unit of FIG. 5.

More in detail, as can be seen from FIGS. 4-6, said support platform 10 comprises two hinges 108 arranged between said first portion 100 and said second portion 101, and said second portion 101 is rotatably coupled to said first portion 100 by means of said two hinges 108.

In particular, said support platform 10 is able to pass from a first position, in which said second portion 101 is overlapped on said first portion 100, to a second position, in which said first portion 100 and said second portion 101 are coplanar.

This allows each evacuation unit 1 to minimize the space occupied when said evacuation unit 1 is in rest position, that is when it is not in use, and to maximize the space occupied when said evacuation unit 1 is in operating position, facilitating, in use, the connection between said evacuation units 1 and the following landing of the users on them.

Said first portion 100 is provided with at least one pair of guides 105, and with a seat 104, slidably movable along said at least one pair of guides 105. In this way, as better described below, each user reduces the time spent on each evacuation unit 1, thus speeding up the evacuation operations from the building E.

Said seat 104 is capable of passing from a rest or rearward position, in which it is arranged in the proximity of said second portion 101, to an operative or advanced position, in which it is arranged in the proximity of said slide 11.

Furthermore, said seat 104 allows each user, during the passage from an evacuation unit 1 to a subsequent evacuation unit 1 positioned at a lower height than the previous one, to maintain a seated position, thus avoiding jumps, sudden movements, or possible stresses potentially dangerous for the stability of each evacuation unit 1.

This sitting position, then, together with the other safety elements present in the system S, allows each user to perceive greater safety during the evacuation from building E.

In fact, the presence of said seat 104 allows people not to lean out, therefore, not perceiving dangerous sensations, and to remain in a low position, protected by the safety element 109.

In addition, the presence of said seat 104 allows people with sensory and/or motor disabilities to independently use each evacuation unit 1 of the system S according to the present invention.

Figure 7:
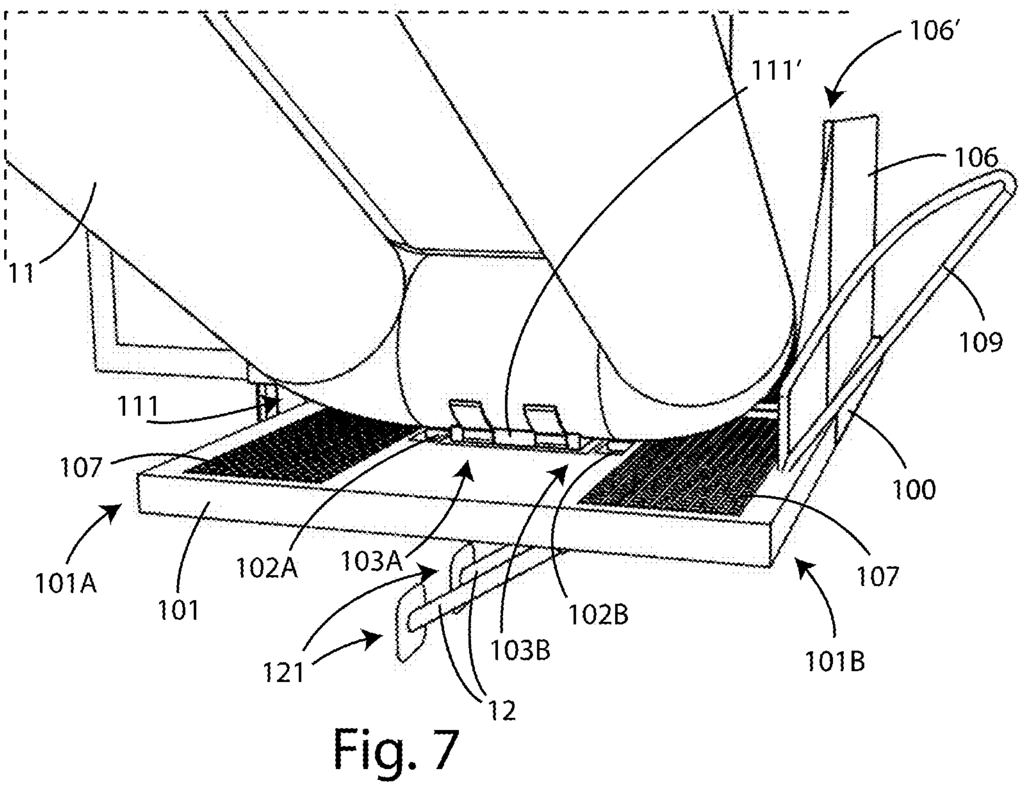
FIG. 7 shows, in detail and perspective view, coupling between an emergency slide and a support platform of the evacuation unit of FIG. 3A.

With particular reference to FIGS. 5 and 7, said second portion 101 comprises a first plurality of anchoring elements 102A and a second plurality of anchoring elements 102B to allow, as better described below, the coupling between said second portion 101 of said first evacuation unit 1 and said slide 11 of said second evacuation unit 1 positioned at a higher height than said first evacuation unit 1.

In particular, each anchoring element 102A of said first plurality of anchoring elements 102A is arranged inside a first slot 103A at a first end 101A of said second portion 101.

Similarly, each anchoring element 102B of said second plurality of anchoring elements 102B is arranged inside a second slot 103B at a second end 101B of said second portion 101.

In the embodiment that is described, said anchoring elements 102A, 102B are bars made of magnetic material. However, in other embodiments, said anchoring elements 102A, 102B can have different shapes and can be made of further materials, including non-magnetic ones.

As will be better described hereinafter, said second portion 101 comprises a support base 107 such as, for example, a grid, made of magnetic material to couple to said slide 11 of said second evacuation unit 1.

Each evacuation unit 1 further comprises a first hinge 130 and two second anchoring and rotation means or second hinges 13.

Said first hinge 130 is connected to the internal wall E1 of said building E, in correspondence with the respective window F.

Said two second anchoring and rotation means or second hinges 13 are arranged at a respective end of the window sill F, on which said evacuation unit 1 is installed.

In particular, these two second anchoring and rotation means or second hinges 13 are able to pass from a first position, in which they are arranged inside said building E, to a second position, in which they are hooked to said window F.

Conveniently, said two second anchoring and rotation means 13 are a substantially "L"-shaped so as to hook, in use, on the sill of the respective window F.

Figure 3A:
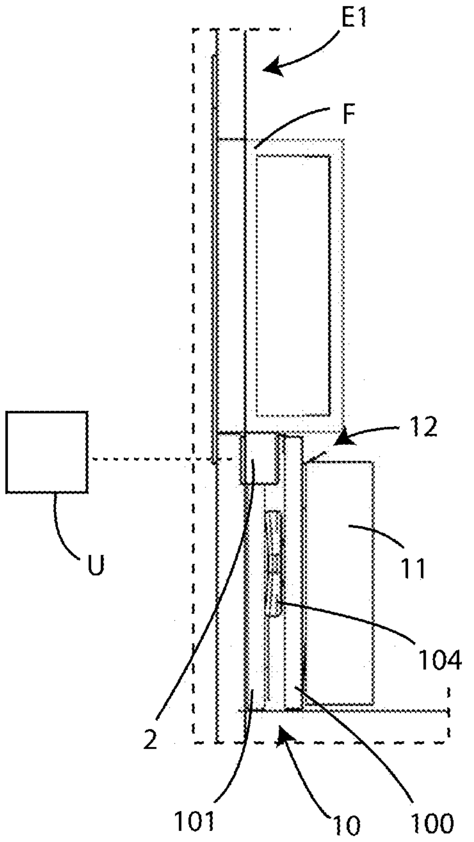
FIG. 3A shows, in a side view, an embodiment of an evacuation unit in a rest position, according to the present invention.
Figure 3B:
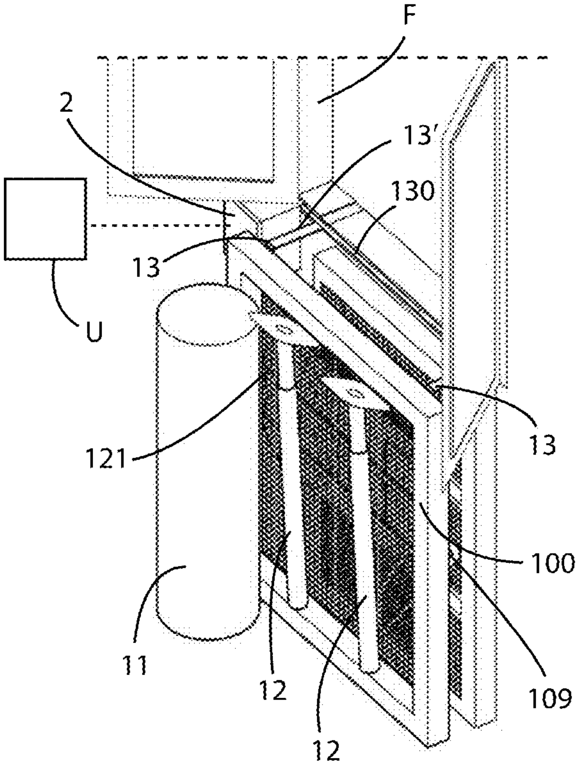
FIG. 3B shows, in perspective view, the evacuation unit of FIG. 3A.

In particular, as can be seen from FIG. 3B, each evacuation unit 1 comprises a respective second hinge 130, connected to said two second anchoring and rotation means 13, to allow each evacuation unit 1 to pass from said rest position to said operating position.

More specifically, each evacuation unit 1 is capable of passing from said rest position to said operating position by means of a first rotation of said platform 10 around the respective first hinge 130, and a second rotation of said platform 10 around said two second anchoring and rotation means or second hinges 13, in which said second rotation is subsequent to said first rotation.

Said two second anchoring and rotation means or second hinges 13 are coupled to the respective platform 10, and to the respective first hinge 130 by means of two arms 13', intended to be housed in corresponding possible housings 13", obtained on the sill of each window F.

Figure 3C:
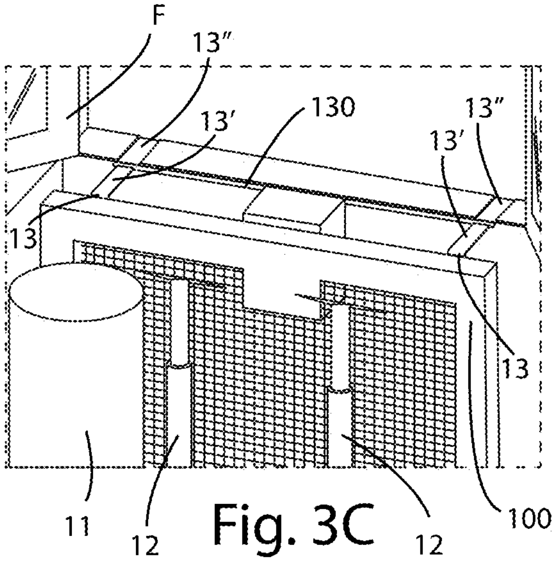
FIG. 3C shows, in perspective view, a further embodiment of the evacuation unit of FIG. 3A.

In the embodiment described, the first rotation of each platform 10 around the respective hinge 130 is a rotation of an angle equal to approximately 180°, where the latter is defined starting from the platform 10 when it is in said rest position, which is arranged parallel to the inner wall E1 of the building E, as shown in FIGS. 3A-3C.

The second rotation of each platform 10 around the two second anchoring and rotation means or second hinges 13 is, on the other hand, a rotation of an angle equal to about 90°, from the position of the platform 10 following said first rotation, after which each arm 13' abuts against the sill of the respective window F, possibly placing itself in a respective housing 13", in order to reach said operating position.

Therefore, in the present embodiment said rotation of said support platform 10 around said first hinge 130 and said two second anchoring and rotation means or second hinges 13 is a rotation of a concave angle equal to about 270°. However, in further embodiments, such rotation may be other than 270°, for example, less than 270°.

Each evacuation unit 1 is, therefore, completely foldable as well as retractable. In fact, as anticipated, each evacuation unit 1 is able to pass from a rest position, in which it is located inside building E, to an operating position, in which it is located outside the same building E.

As already mentioned, each evacuation unit 1 further comprises an emergency slide 11, capable of being coupled, in use, to the further evacuation unit 1 positioned at a lower height than said evacuation unit 1 or to the ground T, in case of said evacuation unit 1 is the evacuation unit 1 arranged at the minimum height from the same ground T.

Said slide 11 has at least one module and is inflatable on command. Furthermore, each slide 11 is made by means of a fireproof fabric coated with graphite, so as to keep the descent speed of each user constant during the evacuation operations.

In particular, said slide 11 has a first end 110, coupled to said support platform 10 on which it is installed, and a second free end 111.

In fact, each slide 11 is capable of passing from a closed position, in which said slide 11 is folded and arranged below said first portion 100 of said support platform 10, to an unfolded position, in which said second end 111 is coupled to said second portion 101 of said support platform 10 of said second evacuation unit 1 or to the ground T.

In particular, as said, when said slide 11 is in said closed position, said first end 110 is coupled to said first portion 100 of said support platform 10. Therefore, when said slide 11 is in use, that is, it is extended, each user positioned on said seat 104, can use said slide 11 without rising from said seat 104, thus minimizing evacuation times. In fact, when said seat 104 is in an advanced position, it is arranged close to said first end 110 of said slide 11.

In addition, said second free end 111 of said slide 11 comprises a first coupling element 110A and a second coupling element 1108 to couple respectively to said first plurality of anchoring elements 102A, and to said second plurality of anchoring elements 1028.

However, in further embodiments of the present invention, said coupling elements 110A, 1108 can be in a number greater than two, for example four.

Figure 9:
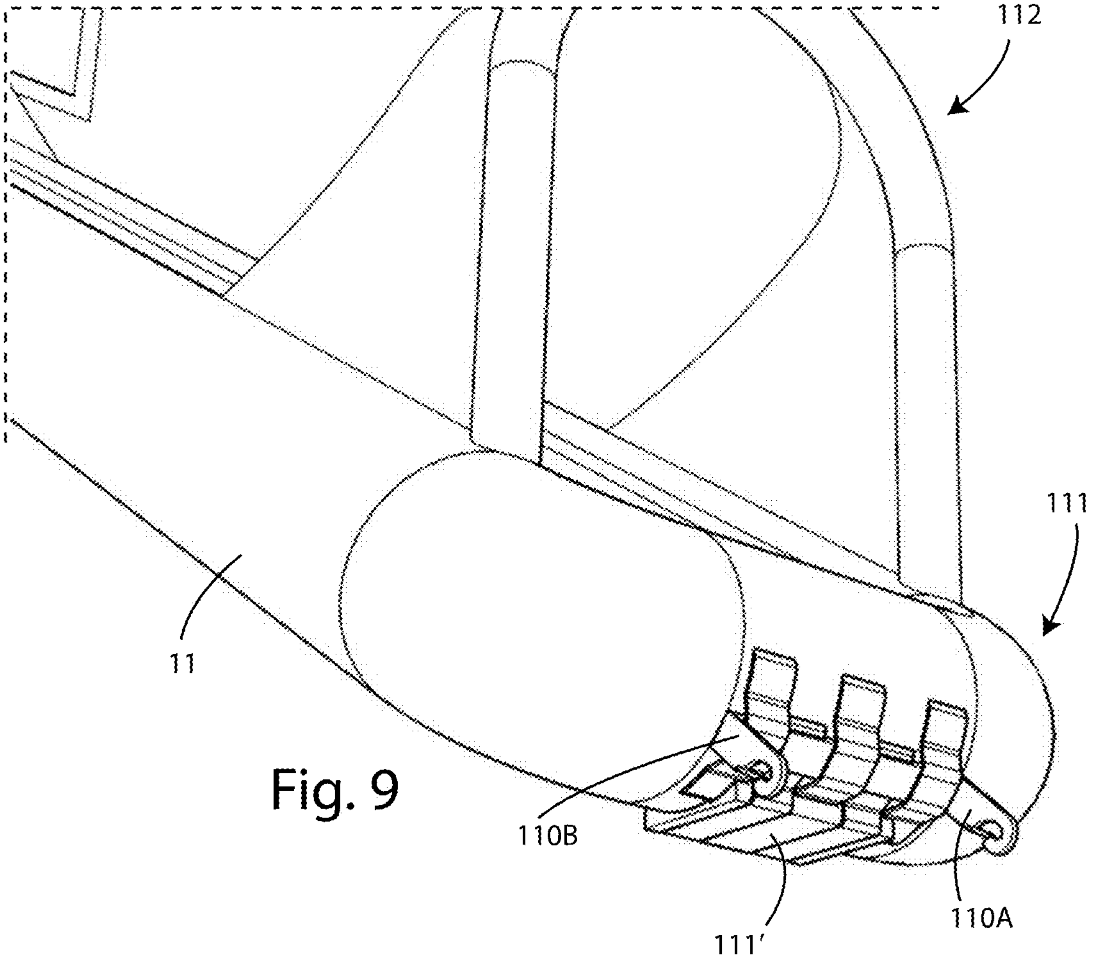
FIG. 9 shows, in perspective view, one end of the emergency slide, according to FIGS. 7 and 8.
Figure 10:
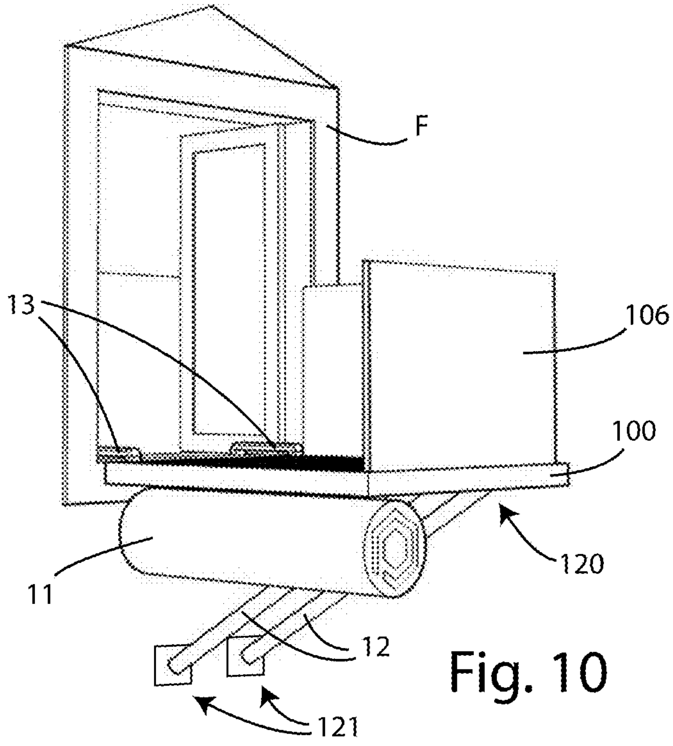
FIG. 10 shows, in perspective view, a further embodiment of the evacuation unit object of the present invention, in an operating position.
Figure 11:
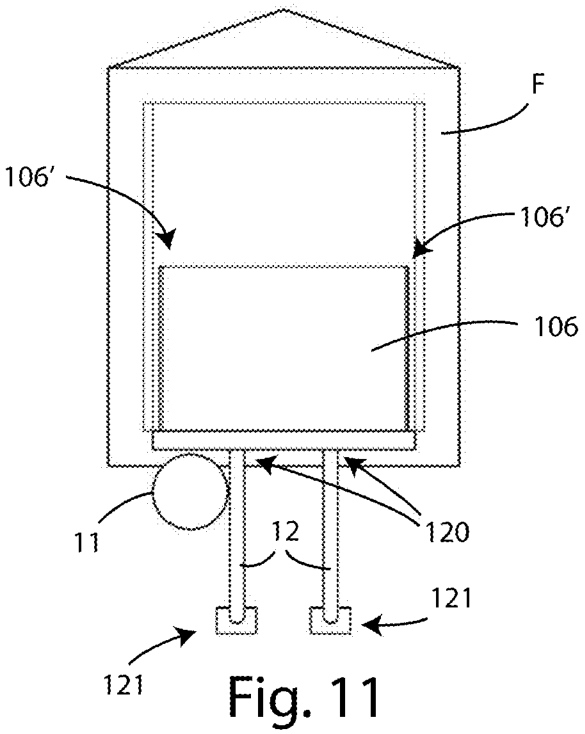
FIG. 11 shows, in front view, the evacuation unit of FIG. 10.

In particular, as can be seen from FIG. 9, in the present embodiment said coupling elements 110A, 1108 are magnetic hooks capable of magnetically hooking and coupling to the respective bars made of magnetic material 102A, 102B.

This allows to realize both a mechanical coupling and a magnetic coupling between said second evacuation unit 1 and said first evacuation unit 1 arranged at a lower height than said evacuation unit 1, or between said second end 111 of said slide 11 of said second evacuation unit 1, and said second portion 101 of said support platform 10 of said first evacuation unit 1. However, in further embodiments of the present invention, said coupling elements 110A, 1108 can provide, for example, only a mechanical coupling with the bars 102A, 102B.

Said second free end 111 of said slide 11 is made by means of a metal fabric capable of coupling with said support base 107 made of magnetic material.

Figure 8:
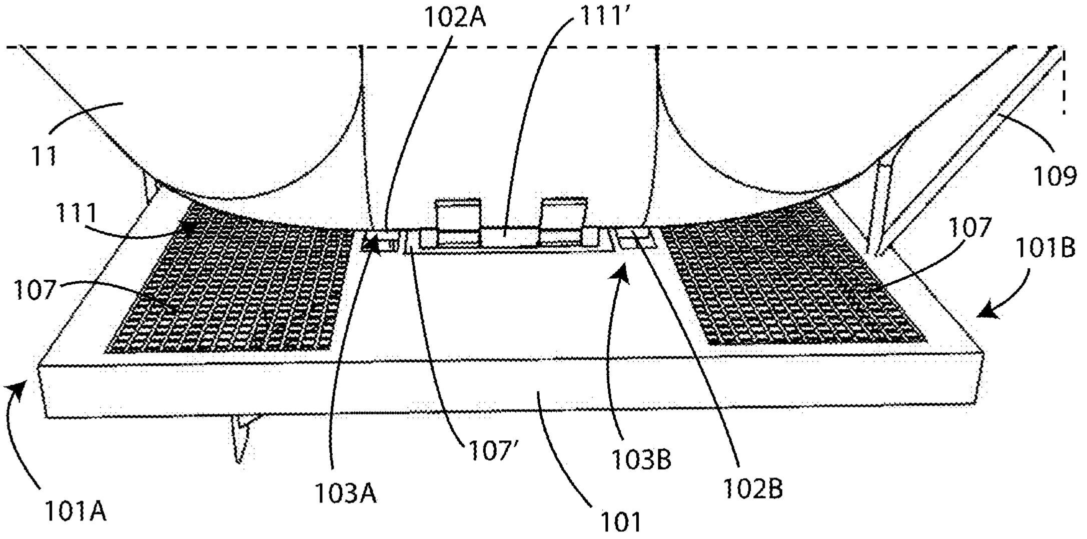
FIG. 8 shows a further perspective view of the coupling between the emergency slide and the support platform of the evacuation unit, according to FIG. 7.

In particular, as can be seen in FIGS. 5, 7, and 8, in the embodiment described, said second end 111 comprises an element 111' arranged in the lower part of said end 111, and said second portion 101 comprises a further element 107' arranged between said first slot 103A and said second slot 103B.

However, in further embodiments of the present invention, said elements 111' and 107' can be arranged differently from what is described above and shown, in particular, in FIGS. 5, 7, and 8.

Advantageously, said element 111' and said further element 107' are capable of magnetically coupling together when said second end 111 of said slide 11 is in correspondence with said second portion 101 of said support platform 10.

This allows the slide 11 to be stabilized in the presence of phenomena such as, for example, oscillations due to wind gusts, safely supporting the weight of the people, while sliding between two evacuation units 1.

Therefore, the coupling between said second end 111 and said support base 107, and the coupling between said coupling elements 110A, 110B and said anchoring elements 102A, 102B, constrain, in use, the slide 11 of said second evacuation 1 to said first evacuation unit 1 located at a lower height than said first evacuation unit 1, or to the ground T.

Furthermore, as can be seen from FIGS. 1 and 2, each slide 11 comprises a portion 112 having an arcuate shape arranged in correspondence with said first end 110.

In particular, said portion 112 is also inflatable on command and allows the user to be protected during the evacuation from the building E, in particular during the passage from platform 10 to the slide 11. By way of example, the user can grab said portion 112, so as to support himself before sliding on said slide 11.

Furthermore, each evacuation unit 1 comprises two supporting elements 12 to support said platform 10 and fix, in use, said support platform 10 to said building E. In fact, said supporting elements 12 have a structural function and allow to distribute the weight of the platform 10 when it is in the operative position.

Each of said two supporting elements 12 has a first end 120 fixed to said first portion 100 and a second free end 121.

More specifically, each of said two supporting elements 12 is able to pass from a first position, in which it is integral with said first portion 100 of said support platform 10, to a second position, in which it forms an angle between 0° and 60° with said first portion 100, and in which said second end 121 contacts said outer wall E2 of said building E.

In the embodiment described, said supporting elements 12 are telescopic hydraulic bars. However, in further embodiments these supporting elements 12 can be bars other than hydraulic bars, but with the same function as the latter.

In particular, said first end 120 of each hydraulic bar 12 is connected to a respective hinge (not shown). This allows the rotation of each hydraulic bar 12, with respect to said first portion 100, from said first position to said second position by means of said respective hinge fixed to said first portion 100.

The protection barrier 106 is configured to protect users during evacuation operations from said building E.

With particular reference to FIGS. 5 and 6, said protection barrier 106 is able to pass from a closed position, in which it is arranged parallel to said support platform 10, to an operating position, in which it is extended and arranged perpendicular with respect to said support platform 10.

More specifically, said protection barrier 106 comprises three longitudinally extending elements 106' to maintain, in use, said protection barrier 106 in an extended position.

In one embodiment of the present invention, these elements 106' are integral with said protection barrier 106 and can be actuated by means of a spring drive, when said support platform 10 is in said operating position.

By way of example, said protection barrier 106 can be made of a heat-resistant fabric, such as, for example, a fireproof fabric.

The safety element 109, such as, for example, a tubular element, is arranged, in use, perpendicularly to said second portion 101 of said support platform 10 and is capable of containing the movements of said slide 11, when it is subject to phenomena such as, for example, oscillations due to wind gusts, preventing said second free end 111 of said slide 11 from moving away from said second portion 101 of said support platform 10.

Similarly, to what has been said for the elements 106', in an embodiment of the present invention, also said safety element 109 is integral with said protection barrier 106 and can be operated by means of a spring drive when said support platform 10 is in said operating position.

By way of example, said safety element 109 can be made, for example, of plastic or aluminum.

Figure 12:
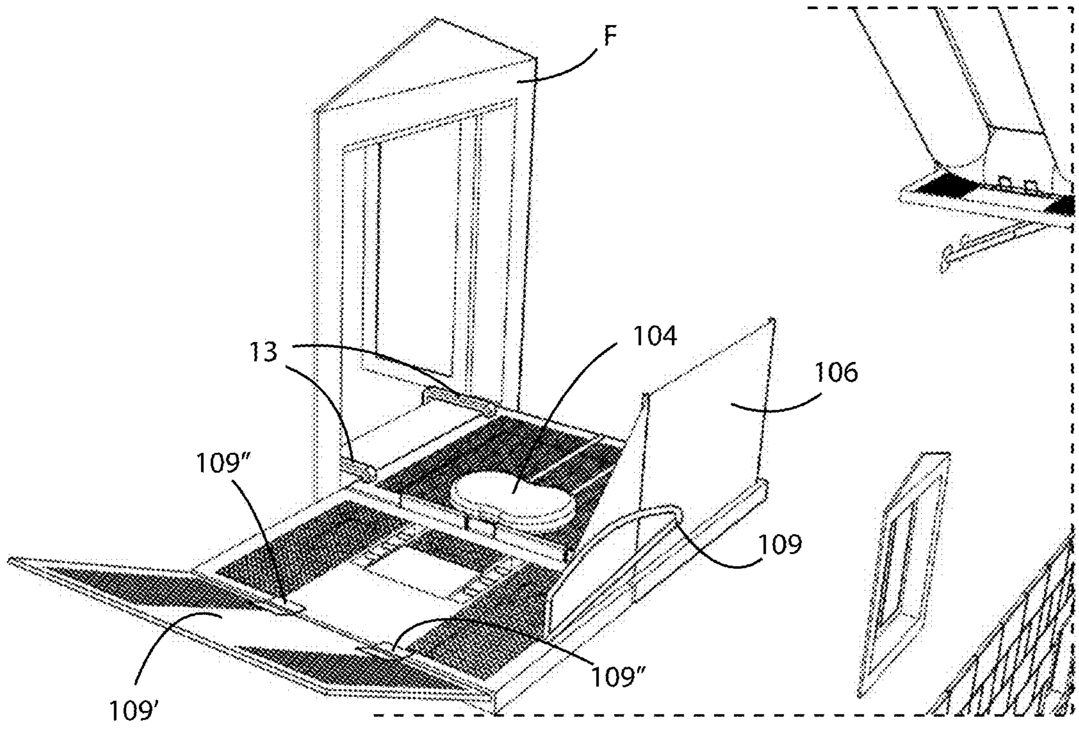
FIG. 12 shows, in perspective view, a further embodiment of the evacuation unit object of the present invention, in an operative position.

In a further embodiment of the present invention, as can be seen in FIG. 12, each evacuation unit 1 comprises a further element 109' or third portion 109', which forms, in use, an angle between 0° and 180° with respect to the plane of said second portion 101 of said support platform 10, and at least two hinges 109" between said further safety element 109' and said second portion 101. By way of example, said further safety element 109' can form an angle equal to about 120° with said second portion 101.

More specifically, said further safety element 109' allows to direct and stabilize said slide 11 when it is subject to phenomena such as, for example, oscillations due to wind gusts, favoring a coupling between said second free end 111 of said slide 11, and said second portion 101 of said support platform 10.

In particular, said further safety element 109', coupled to said second portion 101 in rotation by means of said hinges 109", is able to pass from a first position, in which said further safety element 109' is superimposed on said second portion 101, to a second position, in which said further safety element 109' is arranged not coplanar with said second portion 101 of the support platform 10, so as to form an obtuse angle with respect to said second portion 101.

As said, in the embodiment that is described, said emergency evacuation system S further comprises respective detecting and moving units 2 arranged in proximity to said evacuation units 1.

In particular, each detecting and moving units 2 comprises detecting means (not shown), such as, for example, sensors and moving means (not shown), such as, for example, motors powered by buffer batteries.

More specifically, said sensors allow detecting the position of said respective evacuation unit 1, for example, if said evacuation unit 1 is in said rest position or in said operating position.

Furthermore, said movement means allow to move said respective evacuation units 1 or to allow each evacuation unit 1 to pass from said rest position to said operating position.

Moreover, said system S further comprises activating members (not shown) such as, for example, electric actuators, arranged in correspondence with respective windows F, to open/close said respective windows F.

Finally, said system S comprises a logic control unit U connected to each detecting and moving units 2 and to said activating members.

More in detail, said logic control unit U is programmed and configured to open, by means of said activating members, each of said plurality of windows F in case of emergency.

In fact, these windows F can be opened or closed by sending a first command signal by said logic control unit U to said respective activating members. However, each window F can also be manually opened or closed by the user.

Furthermore, said evacuation units 1 can be activated or moved from said rest position to said operating position, by sending a second command signal from said logic control unit U to said respective detecting and moving units 2.

In particular, said logic control unit U is capable of activating said evacuation units 1 starting from said evacuation units 1 of said windows F arranged in the proximity of said ground T. In this way, in fact, the coupling between said first evacuation unit 1 and said second evacuation unit 1 arranged at a higher height than said first evacuation unit 1.

Moreover, said logic control unit U is further configured to receive position data of each evacuation unit 1 from respective sensors included in said detecting and moving units 2. This allows to monitor the status of each evacuation unit 1, and to intervene, for example, in case of their faults.

In an embodiment of the present invention, said system S further comprises a plurality of light indicators (not shown) arranged at each window F, inside said building E, and a plurality of weight sensors (not shown) such as, for example, piezoresistive pressure sensors, arranged on each evacuation unit 1.

More specifically, each light indicator is capable of emitting for example three light signals in three different colors, namely green, orange, and red, and each weight sensor is capable of detecting the presence of a user on the respective evacuation unit 1.

When the light indicator emits a green signal, the user is authorized to use the evacuation unit 1 of the respective window F in correspondence with which this green signal is emitted.

In a nutshell, the user can evacuate building E using such available evacuation unit 1, which is typically the first evacuation unit 1 arranged at a higher height than all the other evacuation units 1 in a system S as described.

On the other hand, when the light indicator emits a red signal, the user is not authorized to use the evacuation unit 1 of the respective window F in correspondence with which this red signal is emitted.

This means that the weight sensor of the previous evacuation unit 1, arranged at a higher height, has detected the presence of another user, who is sliding towards the other evacuation units 1.

Finally, when the light indicator emits an orange signal, the user can use the evacuation unit 1 of the respective window F in correspondence with which this orange signal is emitted, although this evacuation unit 1 is not the one suggested by the system S.

In fact, this occurs when the weight sensor of the previous evacuation unit 1, arranged at a higher height, has not yet detected the presence of another user, or has detected the presence of another user simultaneously with the detection of the weight of the evacuation unit 1 that the user is using. In this latter case, however, the user can safely evacuate the building E since said further user is at a safe distance.

Therefore, the presence of said light indicators and said weight sensors prevents a user from using a first evacuation unit 1, and therefore the slide 11 connected to it, when another user is evacuating through the slide 11 of a second evacuation unit 1 arranged at a higher height than said first evacuation unit 1. This therefore minimizes any accidents or dangerous situations between the users during the evacuation phases from the building E in which said system S is installed.

The operation of the emergency evacuation system S described above is as follows.

In case of it is necessary to proceed with an evacuation from a building E, due to situations such as to endanger the safety of the people inside it, the control logic unit U receives an alarm signal from said detecting and moving units 2 arranged in correspondence with respective windows F. However, in further embodiments of the present invention, this alarm signal can be transmitted by a remote electronic device, which can be activated manually or by a server in connection with each detecting and moving units 2.

Subsequently, as already anticipated, said logic control unit U activates the opening of each window F of said building E on which each evacuation unit 1 is installed, sending a first command signal to the respective activating members.

Then, said logic control unit U activates each evacuation unit 1 by sending a second command signal from said logic control unit U to said respective detecting and moving units 2.

In particular, said logic control unit U activates each evacuation unit 1 starting from said evacuation units 1 of said windows F arranged in the proximity of said ground T until progressively activating the evacuation units 1 of the upper floors, in an appropriate sequence.

More in detail said logic control unit U activates the second evacuation unit 1 installed in a window F of a given floor of the building E only if the first evacuation unit 1 of the lower floor is already in an operative position.

Moreover, when activated, each evacuation unit 1 rotates from the inside of said building E towards the outside of said building E, passing from a rest position to an operating position.

At the end of this rotation, said supporting elements 12 fix and stabilize each evacuation unit 1 to the outer wall E2 of said building E, and said second portion 101 overturns with respect to said first portion 100.

In particular, said second portion 101 passes from a first position, in which it is overlapped on said first portion 100, to a second position, in which said first portion 100 and said second portion 101 are coplanar.

At this point, each slide 11 of the respective evacuation unit 1 begins to inflate and extends towards the ground T.

In an embodiment of the present invention, each evacuation unit 1 comprises an inflating system (not shown) equipped with at least one cylinder under pressure to initiate the deployment of each slide 11. Each slide 11, therefore, inflates and, while unfolds, sucks in the air inside.

At the end of the inflation of each slide 11, the coupling between said second end 111 and said support base 107 and/or the coupling between said coupling elements 110A, 1108 and said anchoring elements 102A, 1028, allow to constrain said slide 11 of said second evacuation unit 1 to said first evacuation unit 1 located at a lower height than said second evacuation unit 1, or to the ground T.

At this point, the evacuation units 1 of system S are, therefore, connected to each other and able to ensure the safe evacuation of people from the building E.

Figure 13:
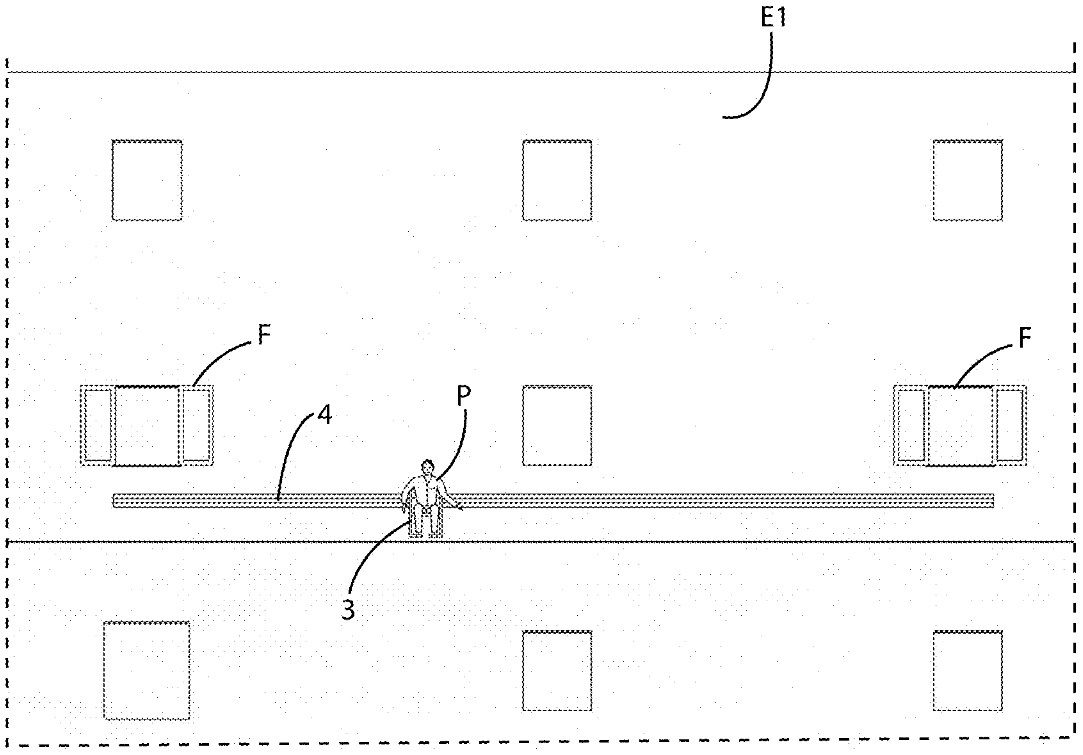
FIG. 13 shows, in front view, an evacuation device for people with motor and/or sensory disabilities, in an operative position.

Furthermore, as can be seen from FIG. 13, in a further embodiment of the present invention, said system S further comprises an evacuation device 3 for users P suffering from motor and/or sensory disabilities.

In particular, said evacuation device 3 is slidingly movable along a guide 4 arranged on the internal wall E1 of said building E, below said windows F. The movement of said evacuation device 3 is enabled when each evacuation unit 1 of the respective windows F of the same floor of said building E, is in an operative position, i.e., it is positioned outside of said building E. In this way, in fact, the movement of said evacuation device 3 along said wall E1 is not hindered by the presence of said evacuation units 1 in rest position.

More specifically, said evacuation device 3 is able to pass from a first position, in which it is positioned in correspondence with a respective window F, to a second position, in which it is positioned in correspondence with a further window F of the same plane of said building E. FIG. 13 shows the use of the evacuation device 3 for moving between two windows F, however, this evacuation device 3 can be used to move between more than two windows placed on the same floor of said building E.

Therefore, as mentioned, the users P, for example injured, will be able to use said evacuation device 3 and move autonomously from a window F to a further window F, positioned on the same floor of said building E, so as to speed up evacuation operations, minimizing the intervention of rescuers or personnel of rescue bodies.

In one embodiment, said evacuation device 3 can be activated automatically. However, in further embodiments, said evacuation device 3 can also be manually activated by users P.

In the embodiment that is described, as said, each evacuation unit 1, when not in use, is arranged inside said building E, so as to be immediately available in case of emergency.

However, each evacuation unit 1 can also be transportable and can be connected, in case of emergency, to the respective window F, by external rescue bodies such as, for example, the Fire-Fighters.

More specifically, these rescue bodies can hook, for example, said anchoring and rotation means 13 or universal hooks, the evacuation unit 1 or the slide 11 to a respective window F of the building E, or to a raised platform, such as, for example, an elevator, a basket and the like.

An advantage of the emergency evacuation system according to the present invention consists in the fact that it allows the landing or the coupling of at least one emergency slide.

In particular, said emergency evacuation system can also be used in the presence of buildings subject to historical constraints, or buildings which, due to constraints which they are subject to, are not equipped with escape systems perfectly suited to the outflow capacity.

Another advantage of the emergency evacuation system according to the present invention consists in the fact that it allows to reach the elevated floors of buildings and the like, in particular the elevated floors of buildings subjected to historical constraints.

Another advantage of the emergency evacuation system according to the present invention consists in the fact that it allows to obtain reduced evacuation times, in particular decimated with respect to the times, for example, of use of emergency stairs or baskets used by the rescue bodies.

A further advantage of the emergency evacuation system according to the present invention consists in the fact that it can be used by anyone such as, for example, people with motor and/or sensory disabilities, children, elderly, or injured.

Another advantage of the emergency evacuation system according to the present invention consists in the fact that it has a high degree of ease of use, being intuitively simple to use in emergency situations.

A further advantage of the emergency evacuation system according to the present invention consists in the fact that it is endowed with high stability.

Furthermore, an advantage of the emergency evacuation system according to the present invention consists in the fact that it comprises foldable and tiltable evacuation units, thus limiting the bulk in case of non-use of the same.

The present invention has been described for illustrative but not limitative purposes, according to its preferred embodiments, but it is to be understood that modifications and/or changes can be introduced by those skilled in the art without departing from the relevant scope as defined in the enclosed claims.

The invention claimed is:

1. Retractable emergency evacuation system from a building lying on a ground and having one or more windows, comprising:

at least two evacuation units, each comprising in turn a support platform fixable to a frame of a respective window, a slide, having at least one module inflatable on command, wherein each slide has a first end coupled to the support platform on which the respective slide is installed, and a second free end, and wherein each slide is capable of passing from a closed position to an unfolded position;

wherein a first of said evacuation units is arranged at a lower height than a second evacuation unit such that, when said slide of said second evacuation unit is in said position unfolded, said second end free of said slide of said second evacuation unit is coupled to said support platform of said first evacuation unit, wherein each evacuation unit comprises at least one hinge, and wherein each support platform is configured to rotate around said at least one hinge by a concave angle.

2. Retractable emergency evacuation system according to claim 1, wherein said concave angle is equal to 270°.

3. Retractable emergency evacuation system according to claim 1, wherein the at least one hinge comprises a first hinge and at least one second hinge, and each evacuation unit is capable of passing from a rest position to an operative position by means of a first rotation of said support platform around said first hinge and a second rotation of said platform around said at least one second hinge, in which said second rotation is subsequent to said first rotation.

4. Retractable emergency evacuation system according to claim 1, wherein when said slide of said first evacuation unit is in said unfolded position, said second free end of said slide of said first evacuation unit is configured to couple to said support platform of a further evacuation unit placed at a lower height with respect to said first evacuation unit or the second free end of said slide of said first evacuation unit couples to with said ground.

5. Retractable emergency evacuation system according to claim 1, wherein each evacuation unit is capable of passing from a rest position, wherein said support platform is arranged inside said building, at an operative position, wherein said support platform is arranged outside of said building and is substantially perpendicular to an external wall of said building, being in correspondence of the respective window.

6. Retractable emergency evacuation system according to claim 1, wherein the retractable emergency evacuation system comprises activating members, arranged in correspondence with said respective windows, for opening said respective windows, in that the retractable emergency evacuation system comprises a plurality of detecting and moving units, arranged in correspondence with said windows, for moving said respective evacuation units, and in that the retractable emergency evacuation system comprises a logic control unit, connected to said activating members and said detection and moving units, wherein said logic control unit is configured for sending a first control signal to said activating members to open said respective windows, and sending a second control signal to said detecting and moving units to move each evacuation unit from a rest position to an operative position.

7. Retractable emergency evacuation system according to claim 6, wherein each detecting and moving unit is further configured to detect the position of said respective evacuation units and to transmit this position to said logic control unit.

8. Retractable emergency evacuation system according to claim 1, wherein the retractable emergency evacuation system comprises:

a plurality of light indicators arranged in correspondence of each window, and a plurality of weight sensors arranged on each evacuation unit, wherein each light signal is capable of emitting a plurality of light signals in respective different colors to authorize a user to use said evacuation unit of said respective window, and wherein each weight sensor is capable of detecting the presence of said user on the respective evacuation unit.

9. Evacuation unit from a building lying on a ground and having one or more windows, comprising a support platform, which can be fixed to a frame of a respective window, a slide having at least one module inflatable on command, wherein each slide has a first end coupled to said support platform on which the slide is installed, and a second free end, and is capable of moving from a closed position to an unfolded position, wherein said evacuation unit is capable of passing from a rest position, wherein said support platform is arranged inside said building, to an operative position, wherein said platform support is arranged outside of said building and is substantially perpendicular to an external wall of said building, wherein each evacuation unit comprises at least one hinge and wherein said support platform is configured to rotate around said at least one hinge by a concave angle.

10. Evacuation unit according to claim 9, wherein said concave angle is equal to 270°.

11. Evacuation unit according to claim 9, wherein the at least one hinge comprises a first hinge and at least one second hinge, and the evacuation unit is capable of passing from said rest position to said operative position by means of a first rotation of said support platform around said first hinge and a second rotation of said platform around said at least one second hinge, wherein said second rotation is subsequent to said first rotation.

12. Evacuation unit according to claim 9, wherein said support platform comprises a first portion, and a second portion movable with respect to said first portion, wherein said support platform is capable of passing from a first position, wherein said second portion is superimposed on said first portion, to a second position, wherein said first portion and said second portion are coplanar.

13. Evacuation unit according to claim 12, wherein said support platform further comprises at least two hinges arranged between said first portion and said second portion, and in that said second portion is rotatably coupled to said first portion by means of said at least two hinges.

14. Evacuation unit according to claim 13, wherein said second portion comprises a first slot at a first end of said second portion, a second slot at a second end of said second portion, a first plurality of anchoring elements and a second plurality of anchoring elements to allow the coupling between said second free end of said slide and said support platform, wherein each anchoring element of said first plurality of anchoring elements is arranged inside said first slot, and each anchoring element of said second plurality of anchoring elements is arranged inside said second slot.

15. Evacuation unit according to claim 14, wherein said second free end of said slide comprises a first coupling element and a second coupling element, to couple respectively to a first anchoring element, of said first plurality of anchoring elements, and to a second anchoring element of said second plurality of anchoring elements.

16. Evacuation unit according to claim 15, wherein said coupling elements are magnetic hooks, and said anchoring elements are bars made of magnetic material, so that said coupling elements are capable of hooking coupling and magnetically coupling to one of said respective bars made of magnetic material.

17. Evacuation unit according to claim 12, wherein the evacuation unit comprises at least two supporting elements, each of said at least two supporting elements having a first end attached to said first portion and a second end free, wherein said at least two support elements are capable of passing from a first position, wherein said at least two support elements are integral with said first portion of said support platform, to a second position, wherein said second end contacts said outer wall of said building.

18. Evacuation unit according to claim 17, wherein said supporting elements are telescopic bars.

19. Evacuation unit according to claim 12, wherein said first portion of said support platform comprises at least one pair of guides, and a seat slidingly movable along said at least one pair of guides, wherein said seat is capable of passing from a rearward position, wherein the seat is arranged in proximity of said second portion, to an advanced position, wherein the seat is arranged in proximity of said first end of said slide.

20. Evacuation unit according to claim 12, wherein said second portion of said support platform comprises a support base made of magnetic material capable of coupling with said second end of said slide, said second end being realized by means of metal fabric.

21. Evacuation unit according to claim 12, wherein the evacuation unit further comprises a safety element arranged, in use, perpendicular to said second portion of said support platform, to prevent said second end of said slide from moving away from said second portion, and a further safety element arranged, in use, transversely with respect to said second portion, to direct and stabilize said second end of said slide in correspondence with said second portion.

22. Operating method of an emergency evacuation system from a building arranged on a ground and having one or more windows, at least two evacuation units, activating members, arranged in correspondence with said respective windows, for opening said respective windows, a plurality of detecting and moving units, arranged in correspondence with said windows, for moving said respective evacuation units, each of said evacuation units comprising in turn a support platform, which can be fixed to a frame of a respective window (F), a slide, having at least one module inflatable on command, wherein each slide has a first end coupled to the support platform on which the respective slide is installed, and a second free end, and wherein each slide is capable of passing from a closed position to an unfolded position;

wherein a first of said evacuation units is arranged at a lower height than a second evacuation unit such that, when said slide of said second evacuation unit is in said unfolded position, said second end free of said slide of said second evacuation unit is coupled to said support platform of said first evacuation unit, wherein each evacuation unit comprises at least one hinge, and wherein each support platform is configured to rotate around said at least one hinge by a concave angle;

wherein the emergency evacuation system comprises a logic control unit, connected to said activating members and said detecting and moving units, wherein, said method comprises the following steps:

A. receiving, from said logic control unit, an alarm signal to signal any emergency situations;

B. transmitting, by means of said logic control unit, a first control signal to respective activating members so as to activate the opening of said respective windows; and C. transmitting, by means of said logic control unit, a second control signal to respective detecting and moving units, so as to activate the rotation of said respective evacuation units.

23. Method according to claim 22, wherein said step B comprises the sub-step of activating, by means of said logic control unit, an evacuation unit of said two or more evacuation units, arranged at a height higher than a further evacuation unit of said two or more evacuation units, only if said further evacuation unit is in said operative position.

24. Method according to claim 22, wherein said step C comprises the sub-step of moving each of said evacuation units from said rest position, wherein said support platform is arranged inside of said building, to said operative position, wherein said support platform is arranged outside of said building and is substantially perpendicular to an external wall of said building.

25. Method according to claim 22, wherein the method comprises, after said step C, the step of coupling said second free end of said slide of said evacuation unit, arranged at height higher than said further evacuation unit, to said support platform of said further evacuation unit, when said slide of said evacuation unit is in said unfolded position.

* * * * *